United States Patent
Hopkins et al.

[11] Patent Number: 5,942,691
[45] Date of Patent: Aug. 24, 1999

[54] DIFFERENTIAL PRESSURE TRANSDUCER ASSEMBLY

[75] Inventors: Russell Bolin Hopkins, Kokomo, Ind.; Edith Marie Small, New Lenox, Ill.; Philip David Kuznia, Carmel, Ind.

[73] Assignee: Delco Electronics Corp., Kokomo, Ind.

[21] Appl. No.: 09/120,357

[22] Filed: Jul. 22, 1998

[51] Int. Cl.[6] .................................................. G01L 7/00
[52] U.S. Cl. ............................................................ 73/706
[58] Field of Search ............................ 73/706, 756, 714, 73/40.5 R, 864.61

[56] References Cited

U.S. PATENT DOCUMENTS

| | | | |
|---|---|---|---|
| 4,866,989 | 9/1989 | Lawless | 73/706 |
| 5,375,472 | 12/1994 | Mitani et al. | 73/706 |
| 5,656,782 | 8/1997 | Powell, II et al. | 73/756 |

*Primary Examiner*—William Oen
*Attorney, Agent, or Firm*—Jimmy L. Funke

[57] ABSTRACT

A differential pressure transducer housing assembly comprising a sensor housing and a connectable cap member. The cap member includes an input port, a post and at least one coupling member. The sensor housing includes an opening for receiving the post of the cap member, and a bracket for engaging the coupling member. When the cap member is connected to the sensor housing, the coupling member and the bracket engage such that the cap member and the housing are fixed in register with respect to each other. Because the cap member is connectable to the sensor housing, numerous cap members having different input port orientations are possible, thus providing flexibility of design with respect to the entire sensor assembly.

8 Claims, 2 Drawing Sheets

DIFFERENTIAL PRESSURE TRANSDUCER ASSEMBLY

TECHNICAL FIELD

The present invention relates to electrical sensor housings and particularly to differential pressure transducer assemblies.

BACKGROUND OF THE INVENTION

Differential pressure transducer devices are used for a variety of purposes. For example, in an automotive application, one use of such transducers is to measure the difference between fuel tank pressure and atmospheric pressure. Because the application requires the transducer to measure a differential pressure, the sensor will necessarily have two inputs or ports one sensing atmospheric pressure and the other sensing fuel system pressure.

For each vehicle model in which a differential pressure transducer is used, the orientation of the two input ports with respect to each other may vary in order to optimize the mounting location of the device. For instance, in the fuel system example above, the pressure transducer is likely to be located on the vehicle somewhere between the engine compartment and the fuel source. Thus, the operating environment of the pressure transducer is likely to be subject to thermal shock and water and/or chemical spray. Since this is an undesirable environment for gathering atmospheric pressure data, the atmospheric pressure input port of the differential pressure transducer is preferably orientated to best facilitate accurate atmospheric pressure data input. In a different vehicle model, because of the location and configuration of the componentry, the orientation of the atmospheric input port may be different.

Due to their positions in a vehicle, differential pressure transducer devices are often subject to significant vibration, shock, thermal, and other forces which can cause premature failure of the device. Since most such transducers are sealed devices in order to prevent contamination and undesirable pressure influence, any cracks or openings in the devices could lead to failure or inaccurate measurements.

Thus, there exists a need for a differential pressure transducer device having variable input port configurations. A need also exists for a more desirable device which minimizes the chances for failure or inaccurate measurements.

SUMMARY OF THE INVENTION

In the present invention, the aforementioned problems are solved through the use of a durable two-piece differential pressure transducer assembly. The assembly includes a sensor housing and a cap member. Because the cap member mounts on the sensor housing, a variety of cap members having different input port configurations can be constructed without the need for manufacturing the entire transducer with a different input port configuration. The cap member and sensor housing are connected by unique coupling members which prevent separation of the cap member from the housing and securely affix the cap member and housing in registration with each other to prevent pressure leaks and possible contaminated passages.

Accordingly, it is an object of the invention to provide an improved differential pressure transducer assembly. It is another object of the present invention to provide an improved mechanism for connecting the two members of the transducer assembly to prevent their separation under a wide range of operating conditions.

Other objects and advantages of the invention will become apparent when viewed in light of the following detailed description and appended claims, and upon reference to the accompanying drawings.

DESCRIPTION OF A PREFERRED EMBODIMENT

Figure 1:
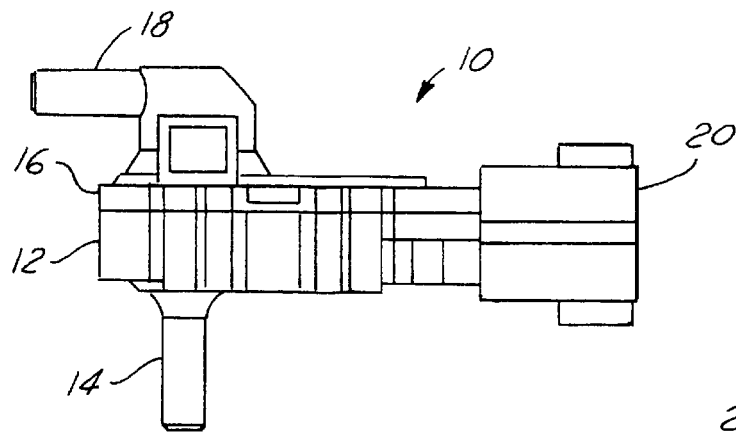
FIG. 1 is a side view of a differential pressure transducer assembly in accordance with the present invention.

Referring now to the drawings, FIG. 1 shows a two-piece differential pressure transducer assembly according to the present invention. The assembly 10 includes a sensor housing 12 having an input port 14 and a cap member 16 having an input port 18. Input ports 14, 18 provide pressure data to a differential pressure transducer (not shown) located in the sensor housing 12. Communication with the differential pressure transducer is conducted through the electrical connector 20.

In operation, input ports 14, 18 are connected, respectively, to two different sources, the pressure differential of which is desired to be measured or monitored. For example, input port 14 may be connected via a hose or other conduit (not shown) to the fuel tank space of an automobile, and input port 18 may be connected to ambient air within the engine compartment of the same automobile. Thus, the pressure differential between the fuel supply and atmospheric pressure can be measured and monitored via electrical connector 20.

Figure 2:
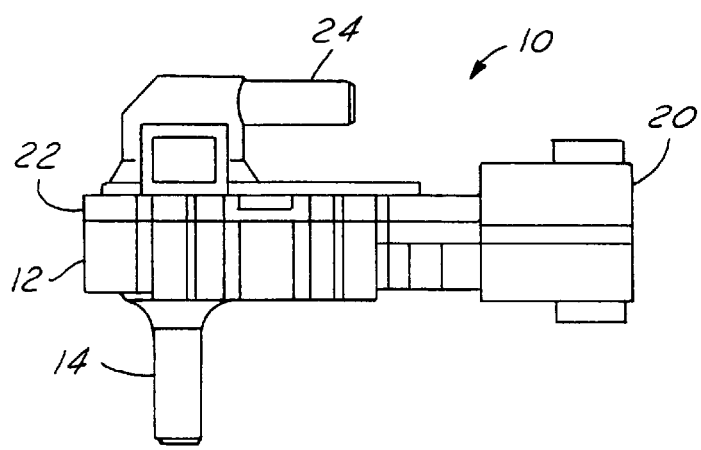
FIG. 2 is a side view of an alternate differential pressure transducer assembly in accordance with the present invention.

FIG. 2 depicts an alternative embodiment for the differential pressure transducer assembly of the present invention. In FIG. 2, the assembly includes a cap member 22 having a different input port orientation 24 than the assembly of FIG. 1. The assembly of FIG. 2 thus allows a conduit connection to the input port 24 of the sensor from a different orientation with respect to the sensor housing 12 than the assembly of FIG. 1. The structure and operation of the devices, however, are otherwise the same.

Figure 3:
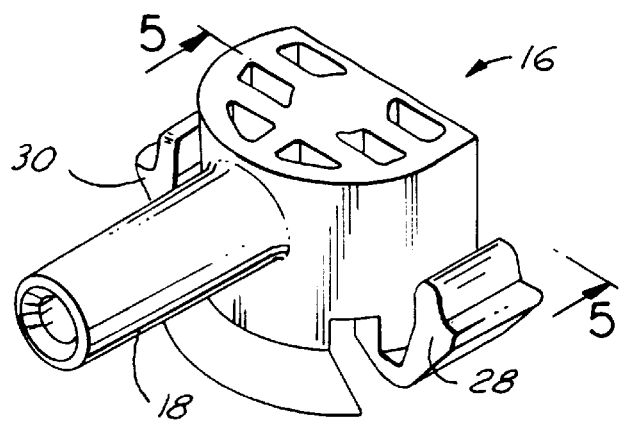
FIG. 3 is a perspective view of a cap member for use with the present invention.
Figure 5:
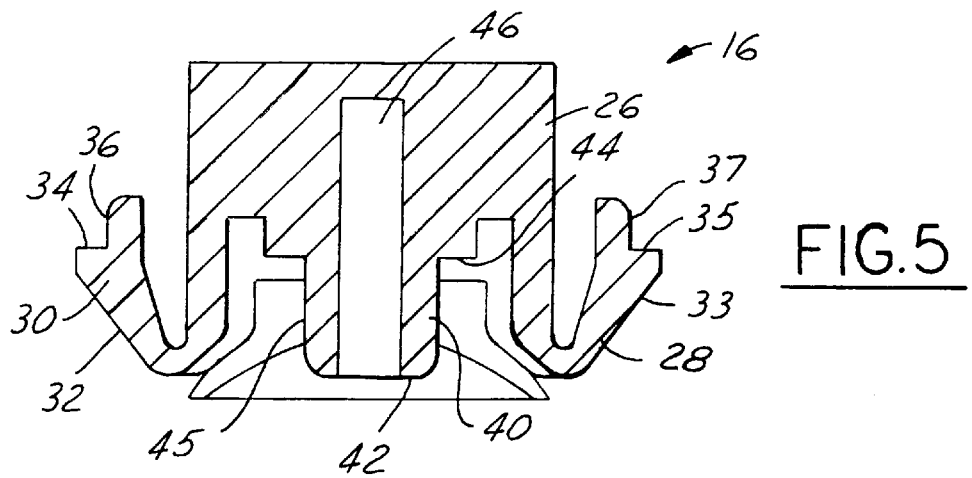
FIG. 5 is a side sectional view of the cap member shown in FIG. 3 taken along line 3—3 in FIG. 3.

A perspective view of a cap member of an assembly made in accordance with the present invention is shown in FIG. 3. A sectional view of the cap member of FIG. 3, taken along line 3—3, is shown in FIG. 5. The cap member includes an input port 18, a body 26 and two resiliently mounted flange members 28, 30 connected to the body. With reference to FIG. 5, each flange member 28, 30 includes a contact surface 32, 33 and locking surfaces 34, 35, 36, 37. Again with reference to FIG. 5, the cap member 16 further includes a post 40 having a distal end 42, a base 44, and an exterior surface 45. The post 40 further includes an interior conduit or channel 46 in operative communication with input port 18.

Figure 4:
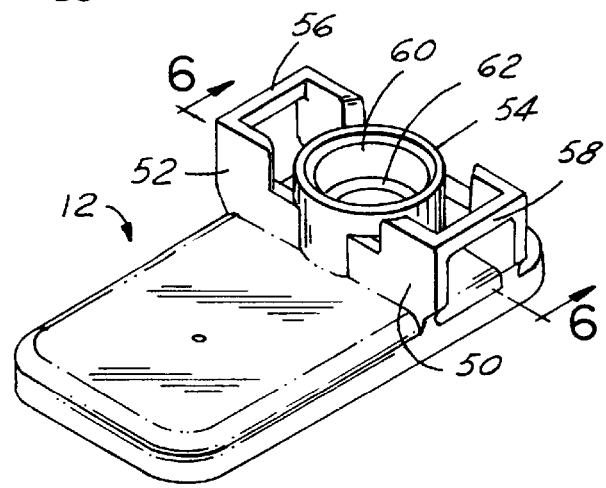
FIG. 4 is a perspective view of a sensor housing cover for use with the present invention.
Figure 6:
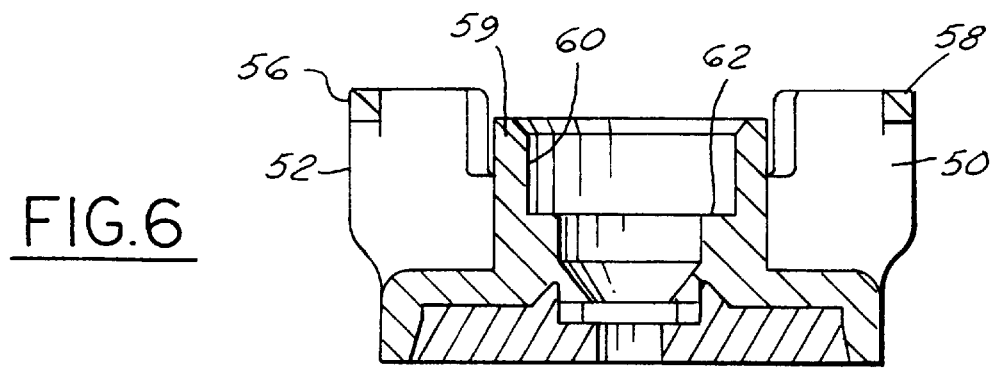
FIG. 6 is a side sectional view of the sensor housing cover shown in FIG. 4 taken along line 4—4 in FIG. 4.

Referring to FIGS. 4 and 6, the sensor housing cover 12 includes two brackets 50, 52 having bars 56, 58. The sensor housing cover 12 also includes a collar 54 having an interior surface 60 and a shoulder 62.

The sensor housing cover 12 and cap member 16 are preferably made of plastic material, such as Celcon M270 Black, made by Hoechst Celanese, although other comparable materials could be utilized.

Figure 7:
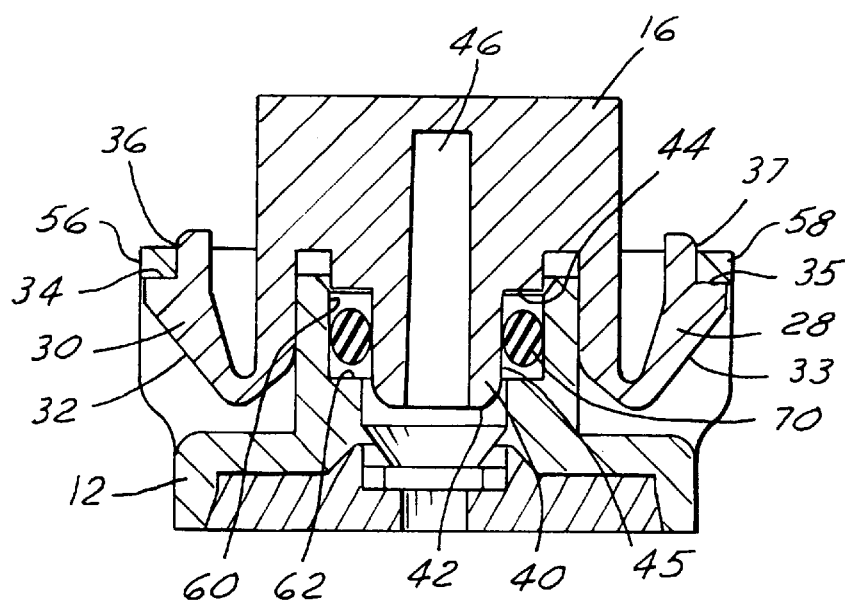
FIG. 7 is a sectional view of the pressure transducer assembly including the cap member of FIG. 5 and the sensor housing cover of FIG. 6.

FIG. 7 shows a sectional view of the cap member 16 and sensor housing cover 12 connected together. To create an air- and water-tight seal from the input port 18 via the interior channel 46 of the post 40 to the sensor housing cover 12, the assembly includes a gasket 70. Gasket 70 is preferably an O-ring located tightly around the exterior surface 45 of the post 40. Insertion of the post 40 of cap member 16 into the collar 54 of the sensor housing cover 12, causes the O-ring 70 to contact the interior surface 60 of the collar 54 to create an air- and water-tight seal.

To connect the cap member 16 to the sensor housing cover 12, the distal end 42 of post 40 is inserted into the collar 54 of the sensor housing cover 12. During insertion, the angled contact surfaces 32, 33 of the resilient flanges 28, 30 contact the bars 56, 58 of the brackets 50, 52. Continued insertion of the post 40 into the collar forces the flanges 28, 30 to bend toward the body 26 of the cap member 16 until locking surfaces 34, 35 pass below the respective bars 56, 58. At that point, flanges 28, 30 spring outwardly from the body 26 of the cap member 16 until locking surfaces 36, 37 contact the respective bars 56, 58, thereby preventing further outward movement of the flanges 28, 30 from the body 26 of the cap member 16. Locking surfaces 34, 35 additionally contact the respective bars 56, 58 to prevent the cap member 16 from being disconnected from the sensor housing 12.

Once the cap member 16 is connected to the sensor housing cover 12 as shown in FIG. 7, the O-ring 70 occupies substantially all of the space defined by the base 44 and exterior surface 45 of the post 40, and the shoulder 62 and interior surface 60 of the collar 54.

To create an air- and water-tight seal, the O-ring 70 is preferably manufactured from a polymer more pliable than the sensor housing 12 or cap member 16. Accordingly, during thermal cycling of the assembly 10, the O-ring 70 is likely to expand and contract at a different rate than either the cap member 16 or sensor housing cover 12.

It has been found that thermal expansion of the O-ring 70 can act in a manner which may force the cap member 16 away from the sensor housing cover 12. Two problems arise in this regard. First, if the distal end 42 of the post 40 does not extend beyond the should 62 of the collar 54 when the cap member 16 and sensor housing cover 12 are connected, the O-ring 70 can expand and act as a wedge against the distal end 42 of the post 40 thereby forcing the cap member 16 away from the sensor housing cover 12. Second, when the cap member 16 is forced away from the sensor housing cover 12 by O-ring expansion, it forces locking surfaces 34, 35 against bars 56, 58 respectively. When locking surfaces 34, 35 are forced against bars 56, 58, the flange members 28, 30 tend to move outward away from the body 26 of cap member 16.

Accordingly, to prevent O-ring expansion from forcing the cap member 16 and sensor housing cover 12 apart, it is desirable to have the distal end 42 of the post 40 located below the shoulder 62 of the collar 54 when the cap member 16 is connected to the sensor housing cover 12. Additionally, to prevent the outward movement of the flanges 28, 30 once the cap member 16 and sensor housing 12 are connected, it is desirable to include locking surfaces 36, 37 to thereby assist in preventing the separation of the cap member 16 from the sensor housing cover 12.

While a particular embodiment of the invention has been shown, it will be understood that the invention is not limited thereto since modifications may be made by those skilled in the art, particularly in light of the foregoing teachings. For example, input port 18 of the cap member 16 could assume any orientation with respect to the sensor housing. Additionally, the bars 56, 58 of the sensor housing cover 12 and corresponding locking surfaces of the flange members 28, 30 could assume numerous configurations and still prevent the upward and/or outward movement of the flange members 28, 30 once the cap member 16 and sensor housing cover 12 are connected. It is, therefore, contemplated that the invention includes all such alternatives, modifications, and equivalents as may be included within the spirit and scope of the appended claims.

What is claimed is:

1. A differential pressure transducer housing assembly comprising:

a cap member including a body, an input port, a post and at least one coupling member, said input port located on said body and in operative communication with said post; and a housing cover including a collar defining an opening for receiving said post, and at least one bracket for engaging said coupling member, whereupon engaging said coupling member and said bracket, said cap member and said housing become interconnected such that said post and said opening form a substantially air and water-tight seal and said cap member and said housing are fixed in registration with respect to each other.

2. The apparatus of claim 1 further comprising a gasket located between said post and said collar, said gasket forming a substantially air- and water-tight seal between said post and said collar.

3. The apparatus of claim 2 wherein said cap member includes first and second coupling members and said housing cover includes first and second brackets, wherein each of said brackets engage one of said respective coupling members to interconnect said cap member and said housing cover.

4. The apparatus of claim 2 wherein said opening in said collar includes a shoulder portion and said post includes a distal end and a base portion, said gasket being located circumjacent said post such that upon engaging said bracket and said coupling member, said distal end of said post becomes fixed in register below said shoulder portion and said gasket is interposed between said base portion and said shoulder portion.

5. The apparatus of claim 2 wherein said coupling member comprises a resiliently mounted flange member, and wherein said bracket comprises a bar, said flange member including a contact surface and a first and second locking surface, whereupon engaging said coupling member and said bracket causes said contact surface of said flange to move against said bar whereupon said flange bends toward said body of said cap member until said first and second locking surfaces of said flange engage said bar to prevent disengagement of said cap member from said housing cover.

6. A sealed differential pressure transducer assembly comprising:

a cap member having a first input port and two opposing resilient flanges each of said flanges including first and second locking surfaces; and a sensor housing having a sensor, a second input port and two opposing contacts in positional agreement with said flanges, said second input port being in operative communication with said sensor, said cap member and said second housing moveable in register with respect to each other such that when said cap member is mounted on said housing, said locking surfaces of said flanges engage said contacts to fix said cap member in register with said housing and form a substantially air- and water-tight seal between said cap member and said sensor housing thereby allowing operative communication between said first input port and said sensor.

7. The apparatus of claim 6 wherein said cap member includes a post in operative communication with said first input port and a gasket circumjacent said post, and wherein said sensor housing includes a collar defining an opening for receiving said post and said gasket, whereupon movement of said cap member in register with said sensor housing causes said post and said gasket to form a substantially air- and water-tight seal with said collar thereby allowing operative communication between said first input port and said sensor.

8. The apparatus of claim 6 wherein said sensor is a differential pressure transducer.

* * * * *